3 Sheets—Sheet 1.
D. Y. KUHNS.
Corn Planter.
No. 235,257.  Patented Dec. 7, 1880.
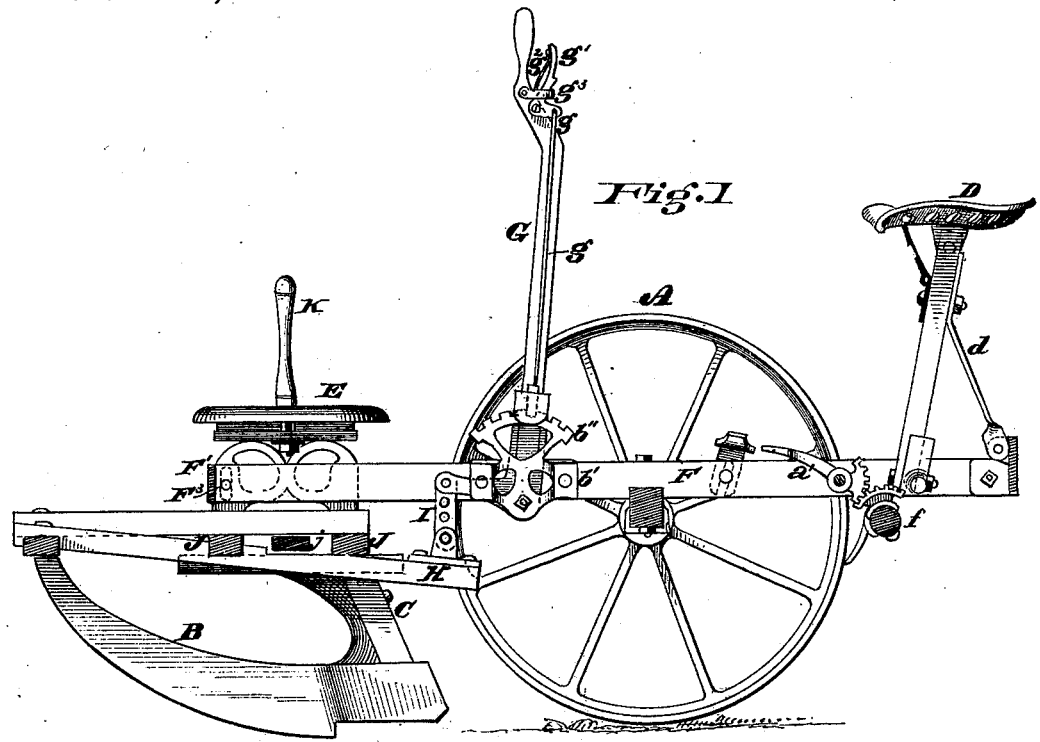
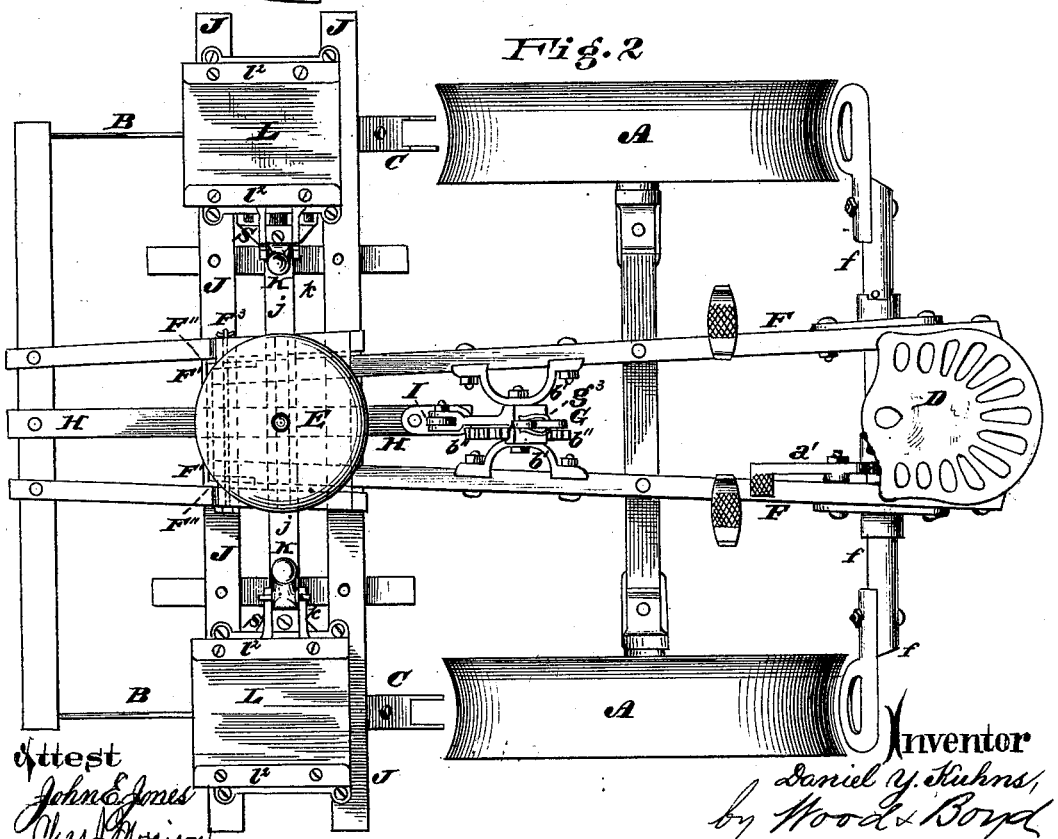
Attest
John E. Jones
Chas. J. Morrison
Inventor
Daniel Y. Kuhns,
by Wood & Boyd
Attorneys

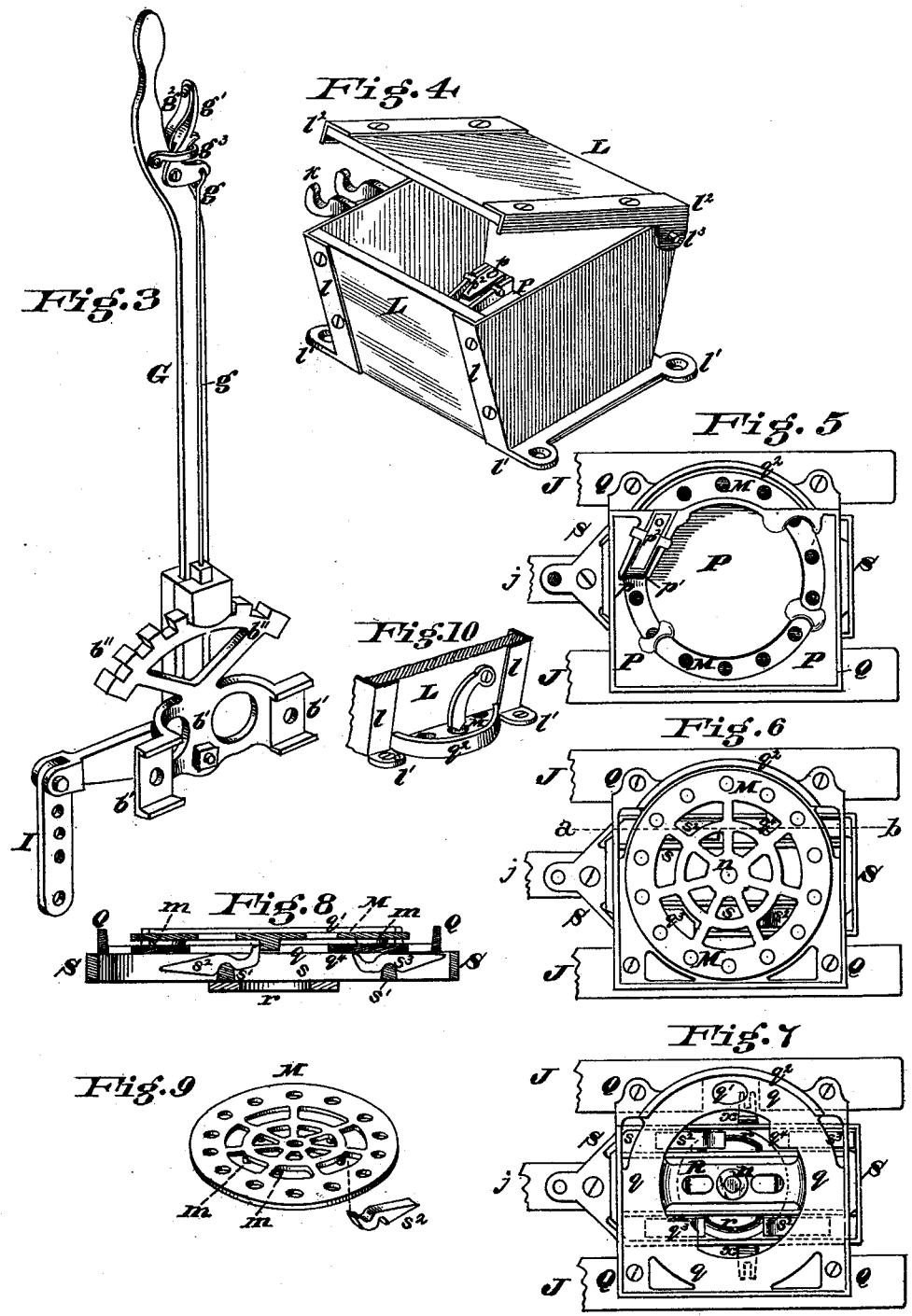
D. Y. KUHNS.
Corn Planter.
No. 235,257. Patented Dec. 7, 1880.

3 Sheets—Sheet 3.

D. Y. KUHNS.
Corn Planter.

No. 235,257.  Patented Dec. 7, 1880.

Attest
John E. Jones
Chas. J. Morrison

Inventor.
Daniel Y. Kuhns,
By Wood & Boyd
his Attorneys

UNITED STATES PATENT OFFICE.

DANIEL Y. KUHNS, OF DAYTON, OHIO, ASSIGNOR TO FARMERS FRIEND MANUFACTURING COMPANY, OF SAME PLACE.

CORN-PLANTER.

SPECIFICATION forming part of Letters Patent No. 235,257, dated December 7, 1880.

Application filed August 29, 1879.

*To all whom it may concern:*

Be it known that I, DANIEL Y. KUHNS, of Dayton, in the county of Montgomery and State of Ohio, have invented certain new and useful Improvements in Corn-Planters, of which the following is a specification.

To enable others skilled in the art to which the invention belongs to make and use the same, I will describe its construction and operation, referring to the annexed drawings, in which—

Figure 11:
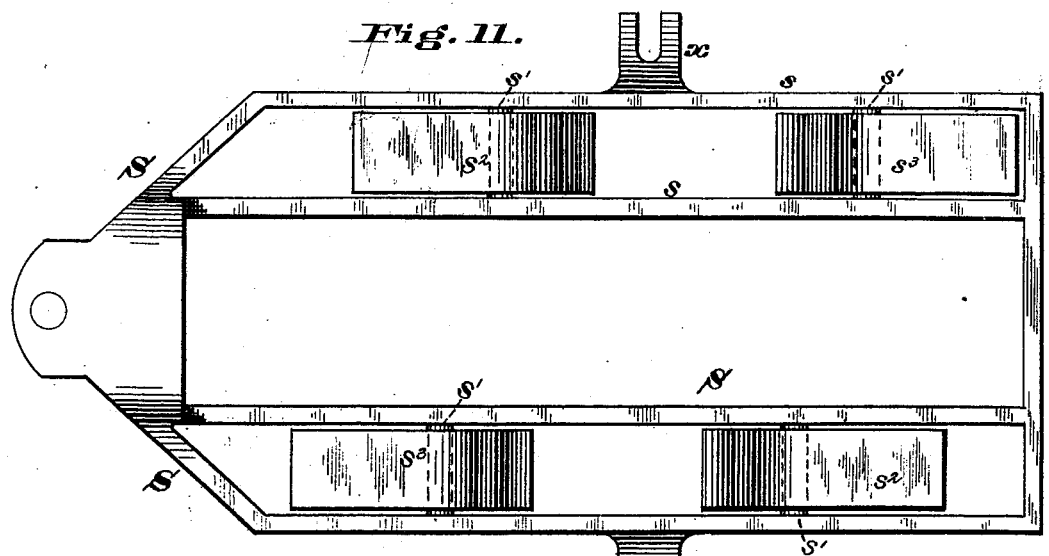
Figure 12:
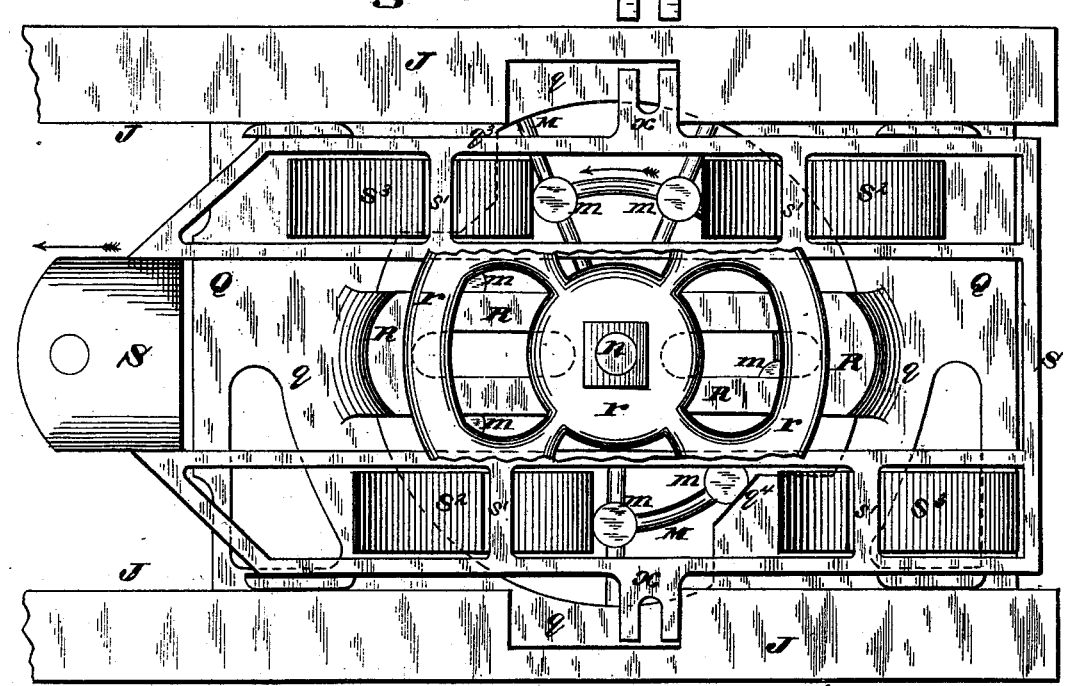

Figure 1 is an inside sectional elevation of the machine. Fig. 2 is a plan of the same. Fig. 3 is a detached view of the locking devices in perspective. Fig. 4 is a perspective view of the hopper. Fig. 5 is a plan of the seeding mechanism with the hopper removed. Fig. 6 is a plan of the same with the cap-plate removed. Fig. 7 is a plan of the same with the dropper-plate removed, showing the driver which operates the dropping-plate. Fig. 8 is a sectional view taken through the line $a\,b$, Fig. 6. Fig. 9 is a perspective view of the dropper-plate and one of the actuating teeters. Fig. 10 is a perspective view of the rear of the seed-box and dropper-plate. Fig. 11 is a top view of the reciprocating driver; and Fig. 12 is a bottom view of the seeding mechanism with a portion of the bed-plate removed.

The invention relates, chiefly, to that class of planters which use a front frame mounted on runners and a rear frame mounted on wheels, the two being flexibly connected, known as "two-horse" or "double-row" planters; but some parts of the invention are equally well adapted for use in other classes of planters.

In the drawings, the planter is shown for operation by hand; but any of the well-known attachments may be employed, so as to operate the dropper-plates automatically through power transmitted from one or both of the ground-wheels.

The invention consists in the combination with the reciprocating bar of two pawls, one on either side, and two pawl-shaped stops, one on either side, the whole being arranged in the manner hereinafter fully described.

The invention further consists in the combination with the dropping devices of a corn-planter, of a pivoted pawl-shaped stop to prevent the dropping-plate from rotating too far, as more fully hereinafter described.

The invention further consists of certain other features, which will be pointed out in the claims.

A A are the ground or drive wheels; B B, the runners; C C, the drop-tubes, provided with valves; D, the driver's seat, axled between the frame-bars F F, and adjustable by means of a pivoted and slotted brace, $d$. E is the attendant's seat, adjustably secured by means of a bolt and nut.

The two bars F F are rigidly attached to the axle about their centers, and flexibly attached at their front ends to the runner-frame, and on their rear ends carry a pivoted scraper-bar, $f$, which the driver operates by a foot-lever, $a'$.

I am aware that these bars are not new; but as used by others they soon wear at the coupling and allow too much play to the machine. To avoid this I combine their front ends by means of a metal casting, F', the flanges, F'', of which form bearings for the pivot-bolt F''' and prevent the sides of the bars from wear.

To the inner side of each of the bars F F is attached a bracket, $b'$, one of which carries or has cast with it a rack, $b''$, and between which is pivoted the crank-lever G, which is connected to the rearward extension of the tongue H by an adjustable arm or link, I. At the side of the lever G is a latch-rod, $g$, working over the circular toothed rack $b''$, and connected at its upper end to an auxiliary lever, $g'$, which is provided with a spring, $g''$, to force the rod between the teeth of the rack.

When it is desired that the front part of the machine should have free play to adjust itself to the surface of the ground, the latch-rod is raised and held up by swinging the pivoted loop $g^3$ over a projection on the lever $g'$. By means of this lever and its connections the shoes or runners B B can be forced into or raised free of the ground, and the depth of the planting regulated at the will of the driver or operator.

Each hopper has a driving-frame, S, connected by a bar, $j$, which carries a lever, K, at each side of the dropper's seat, so that the dropping can be effected by hand, the levers being pivoted loosely on bracket-bearings $k$, on the insides of the hopper-boxes, as shown in Fig. 4. These bearings may be cast with the heads of the seed-boxes or attached by bolts.

The sides and cover of the seed-boxes L, I make of wood and the ends of metal, having angular flanges $l$, to which the sides are fastened, and lugs $l'$ for attaching the box to the frame.

The cover is made longer and wider than the hopper, and is bound on its ends with downwardly-projecting flanges $l^2$, of metal, which are provided with hinge-lugs $l^3$, engaging with pivot-pins on the ends of the hoppers. This arrangement is cheap and neat, and affords absolute protection to the seed against the weather.

The planting mechanism is mounted on the front frame, immediately under the hoppers L, and by novel devices arranged to pass the seed from the hoppers through tubes in the heels of the runners in the usual manner. This mechanism consists of a webbed rotary dropper-plate, M, as clearly shown in Fig. 9, which may be provided with seed-cells of any size and number desired.

On the under side of the dropper-plates are a series of cylindrical lugs, $m$, at right angles from their under surface, for actuating them in connection with the reciprocating frames, as more fully hereinafter described. These plates are held in position by and rotate in a horizontal plane around the stud or pin $n$, in the usual manner.

The dropper-plate, when in position, is covered by a plate, P, the shape of the bottom of the hopper, which has a circular groove over the cells of the dropper-plate, and carries a cut-off, $p$, as shown in Fig. 5. This cut-off is composed of a cast-metal pawl, $p'$, swung on trunnions resting in bearings on the plate P, and is held in position by a plate-spring, $p^2$, of sufficient resiliency to prevent the passage of more than the desired number of grains. By thus arranging the cut-off all liability of grain or dirt working around the spring and preventing it operating, as frequently happens when spiral springs are used, is avoided, and the greatest degree of regularity secured.

Underneath the seed-disk is a diaphragm, Q, rigidly attached to the front frame, J, provided with an annular plate, $q$, upon which the annular cell-ring of the dropper-plate rests, an orifice, $q'$, connecting with the drop-tube C, and a vertical segmental flange, $q^2$, around so much of the dropper-disk as extends behind the hopper, as shown in Fig. 10. The center of the diaphragm within the annular ring is open, and the periphery of the opening is circuline with two projections, $q^3$ $q^4$, the object of which will be explained in connection with the reciprocating frame.

Connected to the under side of the diaphragm-plate is cast a slotted cross-bar, R, whose surface is sunken below the plane of the diaphragm, and which carries the stud $n$, on which revolves the dropper-disk, and to the under end of which stud is secured a webbed bed-plate, $r$, which is secured to the stud $n$, and upon which the reciprocating frame slides.

The reciprocating frame or yoke S is composed of two pairs of horizontal bars, $s\,s$, each pair of which is connected by two cross-bars, $s'\,s'$, which form seats or bearings for the trips or teeters $s^2$ and $s^3$, and is supported up against the under side of the diaphragm by means of the bed-plate $r$, upon which it slides. The inner end of each of these driving-frames is rigidly attached to the bar $j$, as shown in Figs. 2, 5, 6, and 7. A slotted lug, $x$, is cast on each side of said slide, one of which engages with the upper end of the dropper-valve in the dropper-tube and actuates it in the usual manner.

The object in providing a lug on each side of the slide is to adapt them to right or left side use, so that in case of one getting broken any other may be substituted. The liability to break of this particular part of the mechanism is a very serious objection to all other planters of this class.

Advantages in the principle of operation will hereinafter be explained; but there are certain advantages in the principle of construction of this slide, as, for instance, the dispensing with the usual pawl having trunnions bearing in the slide, the cutting away of the metal to form the journal so weakening the slide that it usually breaks at one of these points.

By my plan the bearings $S'$ act as strengthening-bars, and all other means of strengthening the parallel bars of the slide may be dispensed with.

The trips or teeters $s^2\,s^3$, which are loosely seated, as shown, are weighted at their idle ends, whereby their active ends are caused to press upward and perform their work, as hereinafter described.

I will now describe the operation of the seeding mechanism. It will be observed that between the parallel bars $s\,s$, on each side of the slide S, are two teeters, $s^2\,s^3$. Of these, $s^2\,s^2$ are the drivers, and they set in opposite directions, and diagonally in opposite corners of the frame, so that when the frame is moved in one direction one of the trips comes in contact with one of the lugs $m$ on the dropper-plate M, giving a rotary motion to it. As the trip $s^2$, Fig. 12, engaged in driving, advances the teeter $s^3$ in front recedes under the projecting lip $q^3$, and the teeter $s^3$ on the opposite side advances from under the other projecting lip $q^4$, just in time to come in contact with another lug on the dropper-plate at the instant the slide has completed its stroke, and thus the dropper-plate is prevented from being carried too far. By a movement of the slide-plate in an opposite direction a similar operation of the two teeters, which, so far, have been idle, is effected, and thus a continued intermittent rotary motion is given to the dropper-plate by the reciprocation of the slide-bar.

It is obvious that projections to control the stops might be arranged independent of the diaphragm, and I do not therefore limit my invention to this particular arrangement, though I deem it the best.

In all planters of this class with which I am familiar, in which pawls are employed to drive, and rigid lugs on the driving-frame to stop the dropper-plate automatically, when a partial stroke of the reciprocating bar is made, as frequently occurs at the ends of the rows or in turning, it is found, on attempting to complete the stroke, that the pawl and lug on the dropper-plate are so in line that they bind, and a stroke cannot be made without breaking something.

A very important feature of my invention is the absolute certainty with which this objection is overcome by the simple means of the projecting lips $q^3$ $q^4$, retaining the advancing stop beneath the plane of the lugs on the dropper-plate until a full stroke is completed, and so that when a partial stroke is made the dropper-plate is free to have its rotation continued in the same direction without coming in contact with any obstruction; but in operation it will not do this, but remain at rest during the return of the partial stroke and until a full or longer stroke is made in the same direction as the partial one was.

I do not claim the devices herein described and shown for pivoting and adjusting the driver's seat, as such is not my invention.

Having thus described my invention, what I claim is—

1. The reciprocating bar, in combination with two pawls, one on either side, and two pawl-shaped pivoted stops, one on either side, the whole being arranged as herein shown and described.

2. In the dropping devices of a corn-planter, a pivoted pawl-shaped stop to prevent the dropping-plate from rotating too far, substantially as and for the purpose herein shown and described.

3. The reciprocating yoke S, composed of horizontal bars $s$ $s$, connected by two brace cross-bars, $s'$ $s'$, having their upper surfaces constructed with bearings, in combination with the teeters $s^2$ $s^3$, having their under sides constructed with grooved seats resting upon the bearing-surfaces of the cross-bars $s'$, substantially as shown and described.

4. In a corn-planter, the seed-hopper L, having cast-iron ends provided with angular flanges $l$, to which the wooden sides are attached, said flanges having lugs $l'$ for attachment to the frame, in combination with a wooden cover larger than the mouth of the hopper, having its ends provided with downwardly-projecting metal flanges, constructed with lugs $l^3$, to form a hinge-connection by means of pins passed through said lugs, substantially as shown and described.

5. In a corn-planter, the longitudinal bars F F, rigidly attached at about their center to the axle, and flexibly connected at their front ends to the runner-frame, in combination with the metal casting F', having at each end a flange, F'', which embrace and connect the front ends of said bars F, and said flanges forming bearings for the pivot-bolt F''', which forms the connection between the runner-frame and the front ends of the bars, substantially as shown and described.

In testimony whereof I have hereunto set my hand this 25th day of August, 1879.

DANIEL Y. KUHNS.

Witnesses:
  EDWARD D. PAYNE,
  O. M. GOTTSCHALL.